United States Patent
Ohashi et al.

(10) Patent No.: US 7,705,533 B2
(45) Date of Patent: Apr. 27, 2010

(54) TAPERED LIGHT EMITTING STRUCTURE AND LIGHT EMITTING DEVICE HAVING A COLUMNAR LIGHT EXTRACTION LAYER

(75) Inventors: Yoshihiro Ohashi, Tokyo (JP); Tomoyuki Oike, Yokohama (JP); Tatsuya Iwasaki, Machida (JP)

(73) Assignee: Canon Kabushiki Kaisha, Tokyo (JP)

(*) Notice: Subject to any disclaimer, the term of this patent is extended or adjusted under 35 U.S.C. 154(b) by 714 days.

(21) Appl. No.: 11/564,385

(22) Filed: Nov. 29, 2006

(65) Prior Publication Data

US 2007/0126351 A1  Jun. 7, 2007

(30) Foreign Application Priority Data

Dec. 7, 2005 (JP) .............................. 2005-353492

(51) Int. Cl.
*H01J 1/62* (2006.01)
*H01J 63/04* (2006.01)
*G02F 1/1335* (2006.01)
*F21V 7/04* (2006.01)

(52) U.S. Cl. .................. 313/506; 313/508; 349/70; 362/613; 362/614

(58) Field of Classification Search .................. None
See application file for complete search history.

(56) References Cited

U.S. PATENT DOCUMENTS

2003/0184664 A1  10/2003  Iwasaki .................. 348/272
2006/0049745 A1  3/2006  Handa et al.

FOREIGN PATENT DOCUMENTS

JP  2002-278477  9/2002
JP  2004-296438  10/2004

OTHER PUBLICATIONS

Toshihiko Baba, Kyoji Inoshita, Hiroko Tanaka, Jun Yonekura, Maiko Ariga, Akihiro Matsutani, Tomoyuki Miyamoto, Fumio Koyama, and Kenichi Iga, "Strong Enhancement of Light Extraction Efficiency in GaInAsP 2-D-Arranged Microcolumns," J. Lightwave Technol. 17, 2113- (1999) http://www.opticsinfobase.org/abstract.cfm?URL=JLT-17-11-2113.*

* cited by examiner

*Primary Examiner*—Toan Ton
*Assistant Examiner*—Britt D Hanley
(74) *Attorney, Agent, or Firm*—Fitzpatrick, Cella, Harper & Scinto

(57) ABSTRACT

Provided is a light emitting material in which: a light emitting layer comprising a columnar part of which a cross-sectional shape is column such as cylindrical column, and a light emitting part of which a cross-sectional shape is cone or pyramid; and light generated in the light emitting part is extracted outside through the columnar part. The light emitting material allows light to be efficiently extracted to the outside to improve luminance.

12 Claims, 10 Drawing Sheets

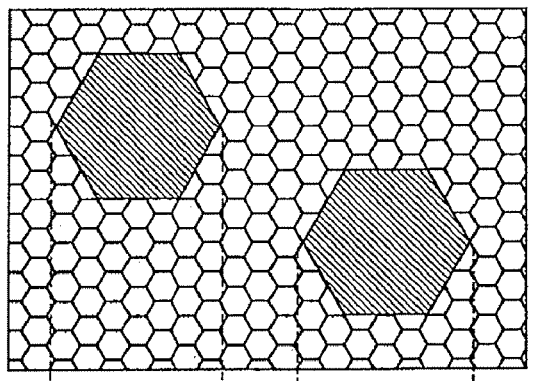
FIG. 2A
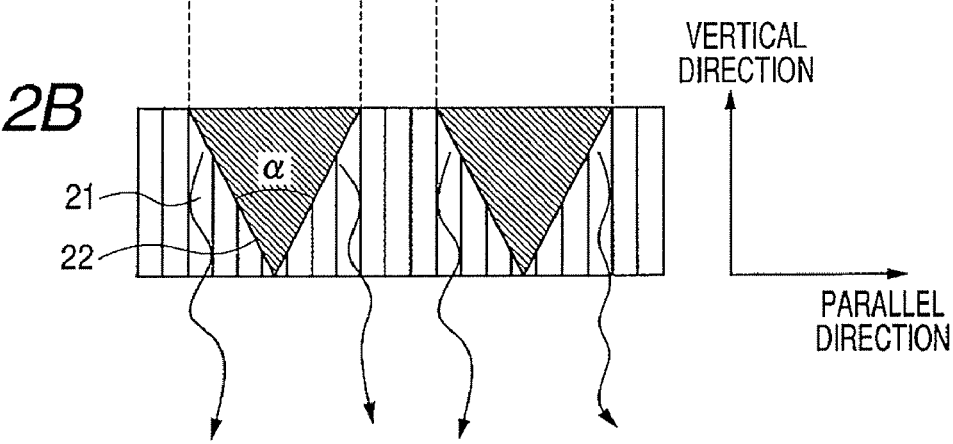
FIG. 2B
FIG. 3
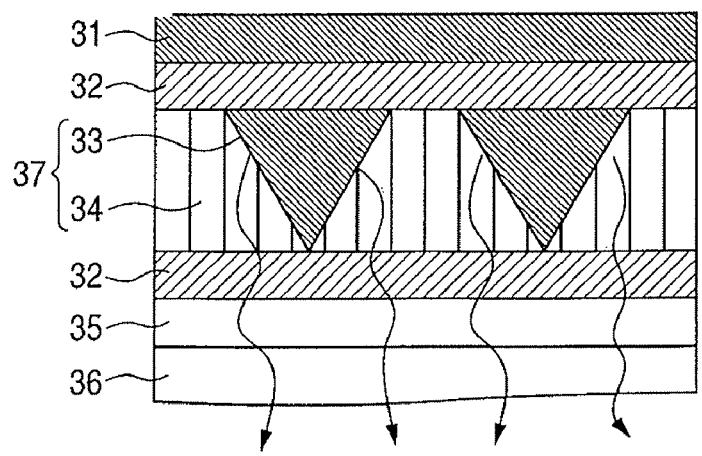

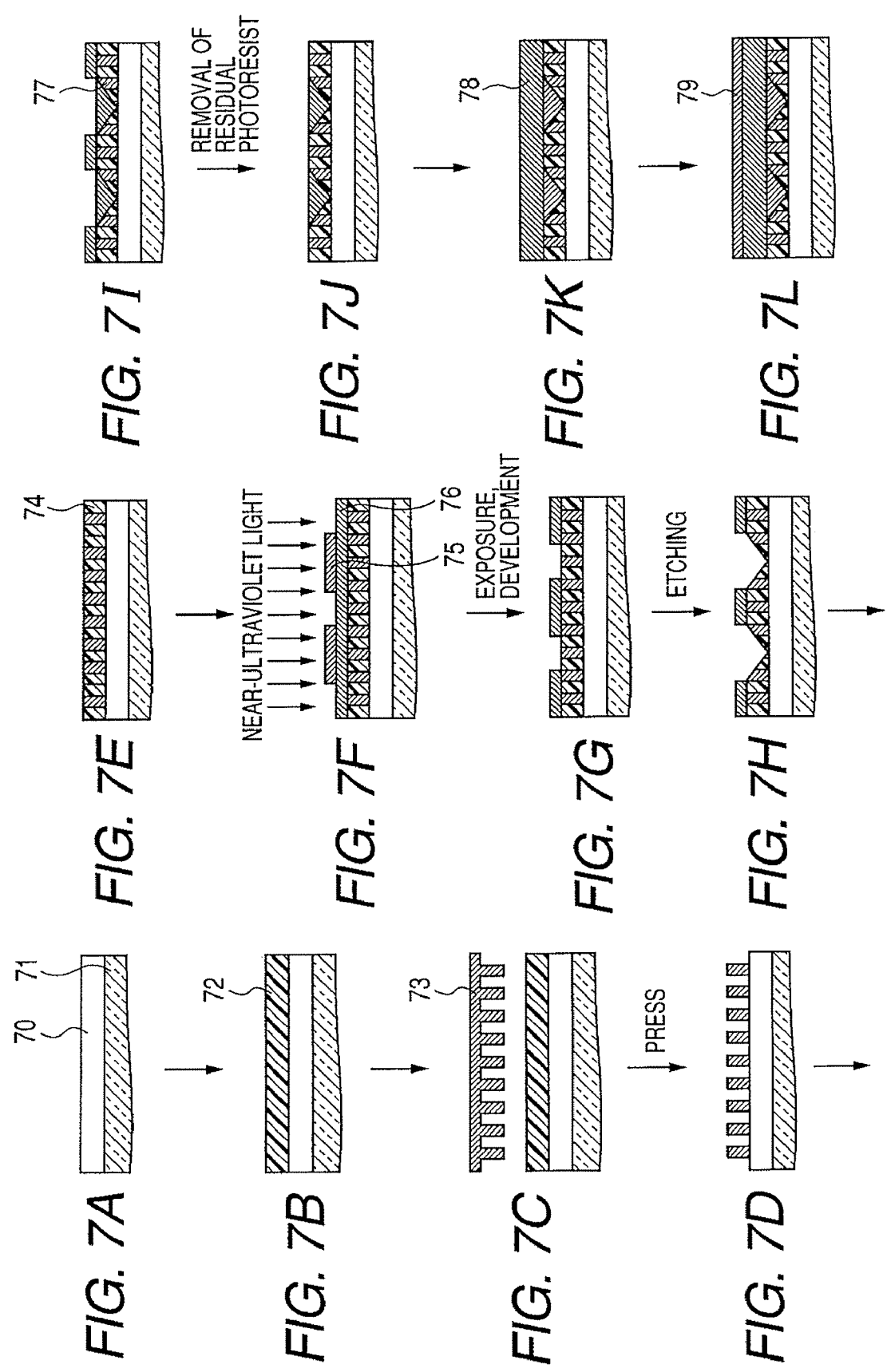

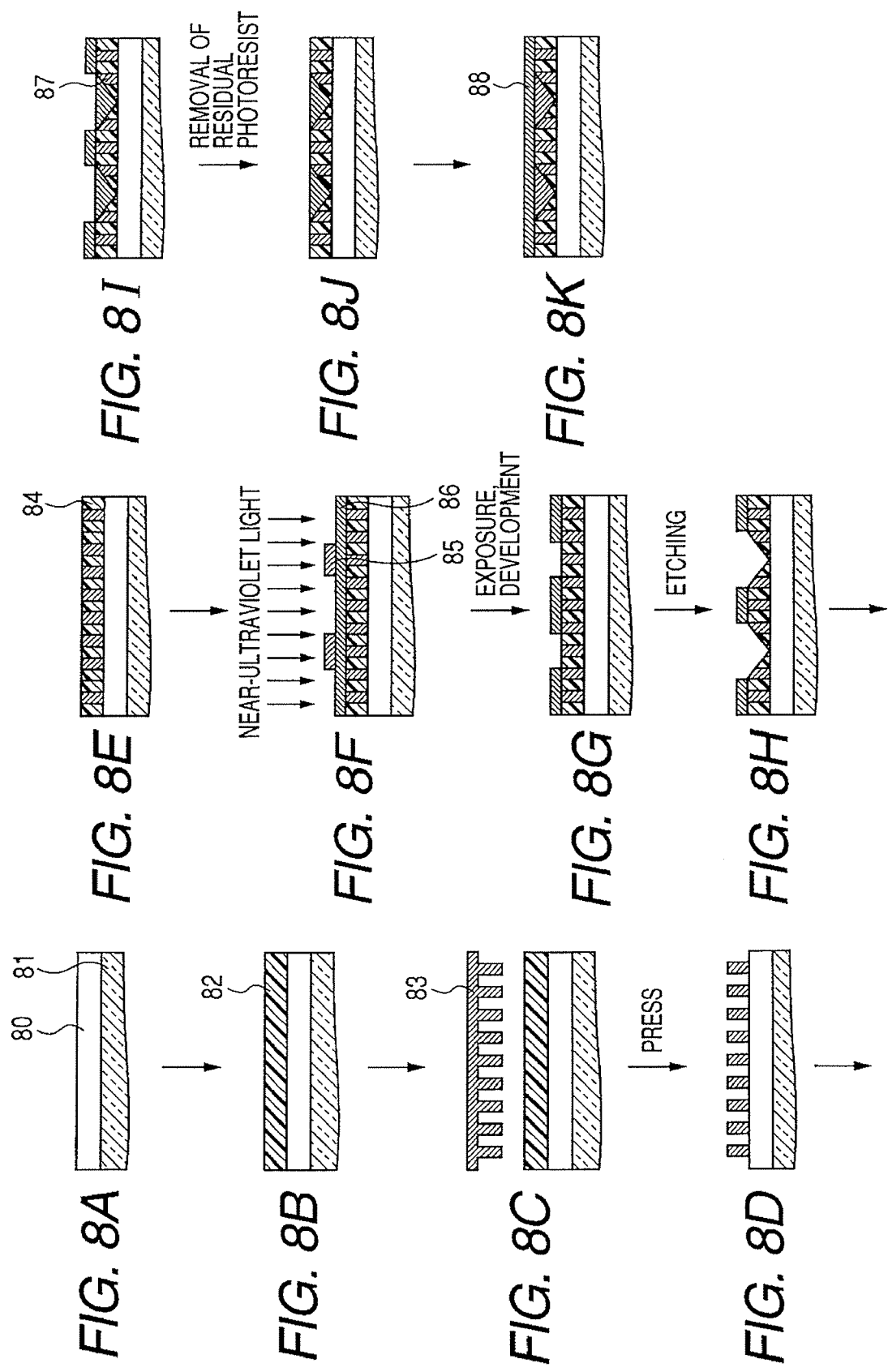

TAPERED LIGHT EMITTING STRUCTURE AND LIGHT EMITTING DEVICE HAVING A COLUMNAR LIGHT EXTRACTION LAYER

BACKGROUND OF THE INVENTION

1. Field of the Invention

The present invention relates to a light emitting structure and a light emitting device, which allow light to be extracted to the outside with efficiency to attain an improved luminance.

2. Description of the Related Art

Displays such as an electroluminescent (EL) display and a field emission display (FED) have been attracting attention as a flat panel display (FPD) using fine particles and a thin film both having a light-emitting function. The features of the EL display reside in that the EL display is self-luminous and is a perfect solid type, which is conducive to an excellent environmental tolerance.

Examples of the EL device include: an inorganic EL using electroluminescence produced by an inorganic material; and an organic EL using current injection luminescence produced by an organic material. In general, light generated in those EL devices is all reflected unless being made incident on an interface at an angle smaller than a critical angle, which makes it difficult to extract all the light to the outside. The light-extracting efficiency is typically around 20%, though depending on the material constituting the device. Examples of a method to improve the light-extracting efficiency include: a method disclosed in Japanese Patent Application Laid-Open No. 2002-278477, in which a low-refractive layer is provided between a transparent electrode layer and a transparent substrate; and a method disclosed in Japanese Patent Application Laid-Open No. 2004-296438, in which a transparent electrode is provided with an irregular surface.

According to the above-mentioned methods, however, it is necessary to provide the low-refractive layer or a light scattering layer in addition to the constituent elements such as the substrate and a light emitting layer, which makes the structure of the device and also a manufacturing process therefor complicated, leading to a difficulty in quality control of the light emitting device and to an increase in cost of manufacturing.

It is also possible to use a monocrystalline thin film for a light emitting part (thin-film type) (see FIG. 9A). In the case of using the monocrystalline thin film, excellent quantum efficiency can be assumed in general, whereas the light-extracting efficiency is limited to about 20%. Also, it is difficult to produce monocrystal in a large size, leading to an increase in cost.

Meanwhile, according to a conventional structure in which microcrystal or fine particles is used for a light emitting part (light emitting particle scattering type) (see FIG. 9B), the light-extracting efficiency is increased due to a scattering of light caused at the interface. At the same time, however, the surface area is increased, leading to an increase in the number of nonluminous centers, thereby decreasing the quantum efficiency. The quantum efficiency may be increased by adopting microcrystal in a relatively large size (0.1 μm or more), while adversely making the surface rough in general, which becomes an impediment in making the device thinner. In FIGS. 9A and 9B, reference numeral 91 denotes an electrode; 92, an insulating layer; 93, a dielectric film; 94, a light emitting layer; 95, a transparent electrode; and 96, a glass substrate. The above-mentioned problems can be solved by the following structure and manufacturing method according to the present invention.

SUMMARY OF THE INVENTION

In view of the above-mentioned problems inherent in the prior art, the present invention provides a light emitting structure and a manufacturing method therefor, the light emitting structure employing a structure in which a light emitting layer itself is capable of improving light-extracting efficiency.

The present invention provides a light emitting structure comprising a light emitting layer provided on a primary surface, the light emitting layer comprising a plurality of light emitting parts and a plurality of columnar parts provided between the plurality of light emitting parts, wherein: the light emitting parts each have a solid shape of which cross-sectional area in a direction parallel to the primary surface decreases from the primary surface side to a side opposite to the primary surface side, or from the side opposite to the primary surface side to the primary surface side; and at least a part of the plurality of the columnar parts is in contact with the light emitting part, and light generated in the light emitting part is extracted through the columnar parts.

Shape of the light emitting part is preferably a cone or a pyramid. The cone and the pyramid include: cone; trigonal pyramid; quadrangular pyramid; and polygonal pyramid of pentagonal pyramid or more, and also include: truncated cone; trigonal truncated pyramid; quadrangular truncated pyramid; and polygonal truncated pyramid of pentagonal truncated pyramid or more. In the present application, the term "substantially vertical direction" refers to a vertical direction, or to a direction tilted from the vertical direction with respect to the substrate but can be deemed as substantially vertical (hereinafter the same). It is preferable that the light emitting part is in contact with at least 20 of the columnar parts to allow light generated in the light emitting part to be extracted through the columnar parts with high efficiency.

The light emitting layer is preferably 5 μm or less in thickness. Here, it is assumed that the shape of the light emitting part is a cone, regular trigonal pyramid, or regular polygonal pyramid of regular tetragonal pyramid or more (or truncated cone, regular trigonal truncated pyramid, or regular polygonal truncated pyramid of regular tetragonal truncated pyramid or more). In each case, a cross-section of the light emitting part in a direction parallel to the primary surface preferably has 1 μm or less of a diameter of the circle, of a side of the regular triangle, or of a diagonal line of the polygon of regular tetragon or more. Also, it is assumed that a shape of the columnar part is cylindrical column, regular triangular column, or regular polygonal column of regular tetragonal column or more (or cylindrical truncated column, regular trigonal truncated column, or regular polygonal truncated column of regular tetragonal truncated column or more). In each case, a cross-section of the columnar part in a direction parallel to the primary surface preferably has 300 nm or less of a diameter of the circle, of a side of the regular triangle, or of a diagonal line of the polygon of regular tetragon or more.

There is a case where it cannot be assumed that the shape of the light emitting part is a cone, regular trigonal pyramid, or regular polygonal pyramid of regular tetragonal pyramid or more (or truncated cone, regular trigonal truncated pyramid, or regular polygonal truncated pyramid of regular tetragonal truncated pyramid or more). In such the case, when a cross-sectional shape of the light emitting part in a direction parallel to the primary surface is converted into a circle having the same cross-sectional area of the light emitting part, a diameter of the circle is preferably 1 μm or less. Alternatively, there is a case where it cannot be assumed that a shape of the columnar part is cylindrical column, regular triangular column, or regular polygonal column of regular tetragonal column or more (or cylindrical truncated column, regular trigonal truncated column, or regular polygonal truncated column of regular tetragonal truncated column or more). In such a case, when a cross-sectional shape of the columnar part in a direction parallel to the primary surface is converted into a circle having the same cross-sectional area of the columnar part, a diameter of the circle is preferably 300 nm or less. Also, it is preferable that a refractive index n1 of the columnar part and a refractive index n2 of the light emitting part be in a relationship of n2/n1>1, so as to allow light to be effectively extracted from the light emitting part to the columnar part.

It is preferable that: the light emitting part and the columnar part each be formed of a material having a chemical formula $ZnWO_4$; the light emitting part have a monoclinic crystalline structure; and the columnar part have a triclinic crystalline structure.

Further, the light emitting material may preferably be an oxide, such as a tungstic oxide or a composite-tungstic oxide containing zinc oxide. Another example of the light emitting material may be an organic material to be used for a light emitting part, and examples of the organic light emitting material include FIrpic and $Ir(ppy)_3$.

The present invention also provides a light emitting device using the light emitting material described above. In particular, the present invention provides: an inorganic EL device, an organic EL device, an organic-inorganic complex light emitting device, a phosphor thin film for FED, and a scintillator for radiation.

The present invention also provides a manufacturing method for the light emitting material described above. That is, the method is a forming method for forming on a substrate by sputtering a light emitting layer comprised of a light emitting part having a shape of a cone or a pyramid, and a columnar part contacting with the light emitting part.

According to the present invention, it is possible to obtain a light emitting structure improved in light extracting efficiency and luminance with high quantum efficiency, in particular, a phosphor film. The light emitting structure may be adopted for a phosphor film used in an inorganic EL or an organic EL.

Further features of the present invention will become apparent from the following description of exemplary embodiments with reference to the attached drawings.

BRIEF DESCRIPTION OF THE DRAWINGS

FIGS. 2A and 2B each are schematic diagrams of a light emitting structure according to another embodiment of the present invention, in which a light emitting part has a polygonal pyramid shape, and a columnar part has a polygonal column shape.

FIG. 3 is a structural diagram of a light emitting device according to the present invention.

FIGS. 7A, 7B, 7C, 7D, 7E, 7F, 7G, 7H, 7I, 7J, 7K and 7L each are a structural diagram showing a light emitting device using an inorganic light-emitting material.

FIGS. 8A, 8B, 8C, 8D, 8E, 8F, 8G, 8H, 8I, 8J and 8K each are a structural diagram showing a light emitting device using an organic light-emitting material.

DESCRIPTION OF THE EMBODIMENTS

The present invention is described specifically. FIGS. 1A and 1B and FIGS. 2A and 2B each schematically show an example of a light emitting structure according to the present invention, in particular, a light emitting structure of a thin film.

Figure 1A:
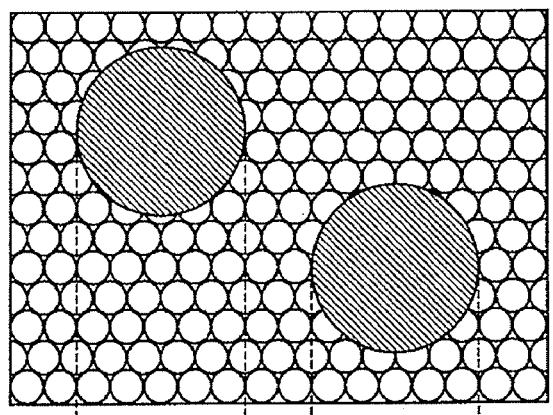
FIGS. 1A and 1B each are schematic diagrams of a light emitting structure according to an embodiment of the present invention, in which a shape of a light emitting part is a cone and a shape of a columnar part is a cylindrical column.
Figure 1B:
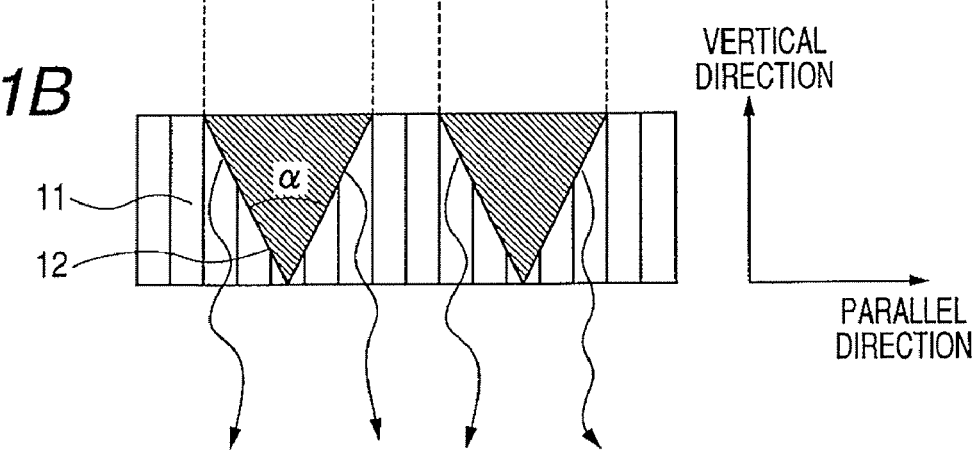

FIG. 1A is a plan view of a thin film having a light emitting structure according to the present invention, in which a shape of a light emitting part is a cone and a shape of a columnar part is a cylindrical column, and FIG. 1B is a sectional view thereof. The light emitting structure includes a columnar part 11 having a shape of a cylindrical column and a light emitting part 12 having a shape of a cone. Light generated in the light emitting part 12 is extracted outside through the columnar part 11, to thereby improve light extracting efficiency. As regards the optimal size and shape of the light emitting part 12, it is preferable that the light emitting part 12 be in a conical shape with a bottom of 1 μm or less in diameter and a cone angle α of 30 to 90 degrees, though depending on the type of the light emitting part and the device structure for application. It is also preferable that: the columnar part 11 be in a cylindrical column shape of 300 nm or less in diameter; and 20 or more of the columnar parts 11 be in contact with the light emitting part 12. If the number of the columnar parts 11 contacting with the light emitting part 12 is decreased to less than 20, the amount of light that can be extracted through the columnar parts 11 reduces. Also, if the cone angle α falls below 30 degrees, the amount of light to be extracted through the columnar parts 11 reduces, while if the cone angle α exceeds 90 degrees, the amount of light to be extracted through the columnar parts 11 also reduces because the total area at which the plurality of the columnar parts 11 contacting with the light emitting part 12 decreases. With the structure shown in FIGS. 1A and 1B, it is possible to attain both high quantum efficiency and high light extraction efficiency at the same time in the light emitting part. Accordingly, a phosphor thin film with high light emitting efficiency can be obtained.

FIG. 2A is a plan view of another thin film having a light emitting structure according to the present invention, in which a light emitting part has a hexagonal pyramid shape and a columnar part has a hexagonal column shape, and FIG. 2B is a sectional view thereof. The light emitting structure includes a columnar part 21 in a hexagonal column shape and a light emitting part 22 in a hexagonal pyramid shape. Light generated in the light emitting part 22 is extracted outside through the columnar part 21, to thereby improve the light extracting efficiency. As regards the optimal size and shape of the light emitting part 22, it is preferable that the light emitting part 22 be in a hexagonal pyramid shape with a bottom having a diagonal line of 1 µm or less and a cone angle α of 30 to 90 degrees, though depending on the type of the light emitting part and the device structure for application. It is also preferable that the columnar part 21 be in a hexagonal column shape having a diagonal line of 300 nm or less, and 20 or more of the columnar parts 21 be in contact with the light emitting part 22.

FIG. 3 shows a structural example when the light emitting structure according to this embodiment is used as an inorganic EL device, and is a conceptual diagram of an AC driving type inorganic EL device in which light is extracted from a substrate side. The EL device is constituted of: an electrode layer 31; a dielectric layer 32; a light emitting part 33; a columnar part 34 serving as a light scattering part; a transparent electrode 35; a substrate 36; and a phosphor thin film layer 37 formed of a light emitting structure according to this embodiment. One of the dielectric layers 32 is used as a primary surface. A thin film of a dielectric of, for example, $BaTiO_3$ may be effectively used for the dielectric layer 32 used in the AC driving type inorganic EL device. The thin film is preferably in thickness in a range of 10 nm to 100 µm. In the case of extracting light from the substrate side, it is preferable that: a transparent electrode 35 made of doped material such as $In_2O_3$, $SnO_2$, ZnO and ITO, having conductivity, be used; and glass or plastic be used for the substrate 36, so as to allow generated light to pass therethrough. The electrode layer 31 may adopt various kinds of metal such as Au, Pt, and Ag and alloy thereof, and a transparent electroconductive film. In this case, each light emitting part 33 contacts with the dielectric layer 32 on the electrode layer 31 side over an area of at most 1 µm$^2$, which is significantly smaller than the area over which the electrode layer 31 contacts with the dielectric layer 32. Accordingly, with the above-mentioned structure, the light emitting device has an excellent flat surface despite that the light emitting device has the phosphor layer including the light emitting parts formed of relatively large crystals (of several µm). Therefore, the thin film according to the present invention is suitably adapted to a phosphor layer of a thin film device.

Figure 17:
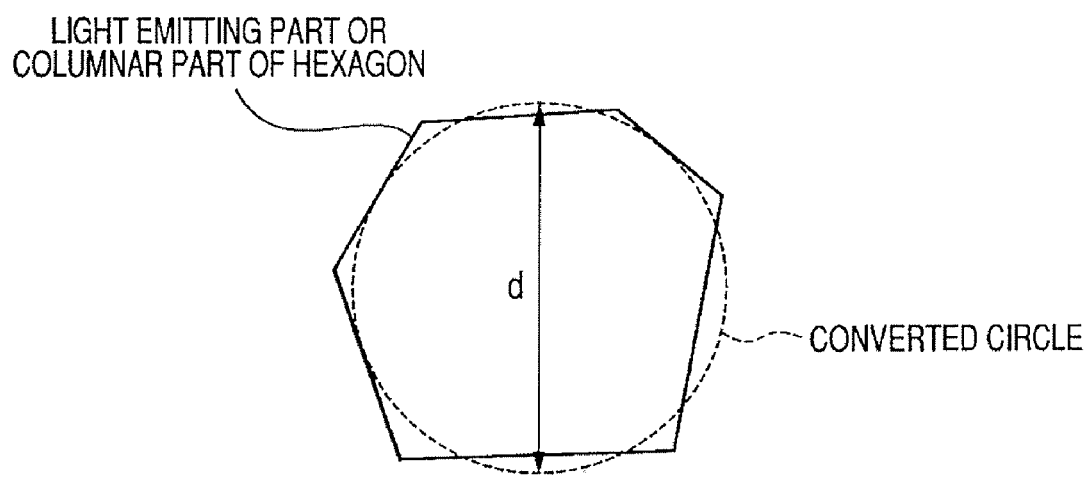
FIG. 17 shows a method of evaluating the size of a light emitting part or a columnar part.

In the embodiment described above, the bottom of the light emitting part and the cross-sectional shape of the columnar part is a circle or hexagon, respectively, and the sizes thereof are evaluated with reference to the diameter of the circle or the length of the diagonal line of the hexagon. However, the bottom of the light emitting part or the sectional shape of the columnar part is not limited to any particular shape, and may be in various shapes, including a distorted hexagon. In view of this, in order to evaluate the sizes of the light emitting part in the bottom and of the columnar part in section, a predetermined shape is converted into a circle as shown in FIG. 17 (in the drawing, the predetermined shape is represented by a hexagon, but may take various shapes in reality) and the diameter d is calculated, to thereby obtain the diameter d of the circle as the evaluation value for the size. According to the evaluation method described above, it is possible to evaluate various shapes by converting them into a circle.

Figure 10:
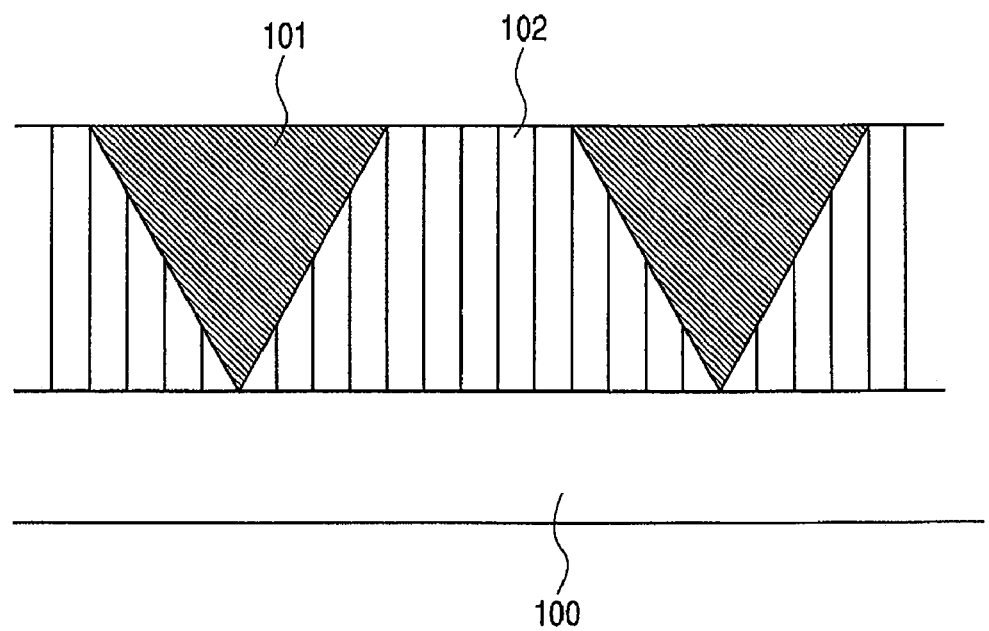
FIG. 10 shows a structural example of a light emitting structure according to another embodiment of the present invention.
Figure 11:
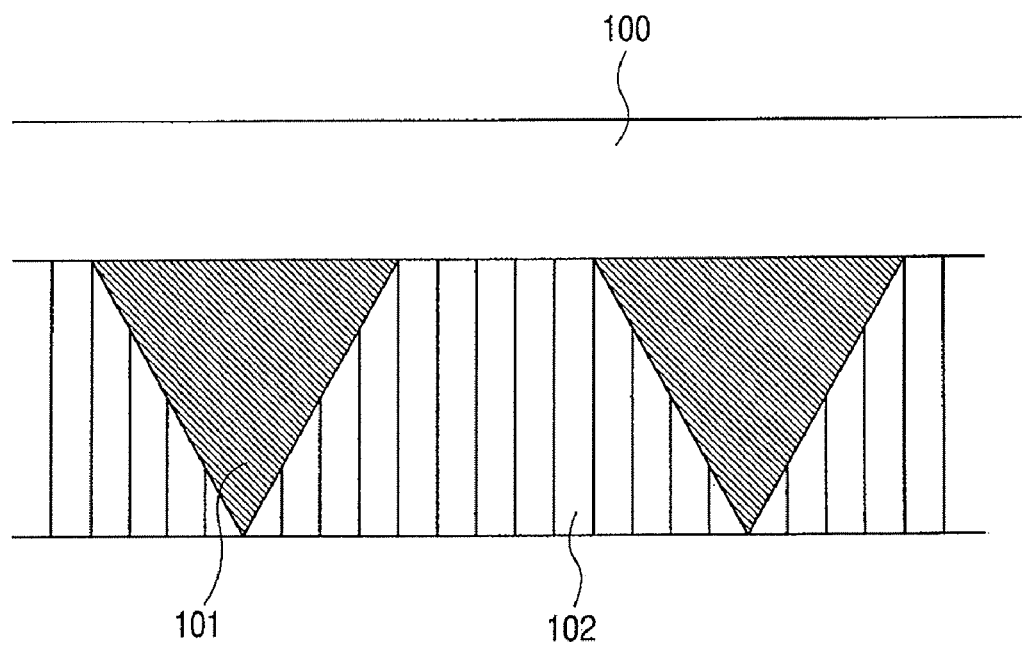
FIG. 11 shows a structural example of a light emitting structure according to a further embodiment of the present invention.

FIG. 10 shows another light emitting structure according to the present invention. In the structure shown in FIG. 10, a transparent substrate 100 is provided as a primary surface (in the case where an electrode or the like is formed on the substrate if necessary, the surface of the electrode or the like serves as the primary surface). Provided on the substrate is a light emitting layer constituted of a light emitting part 101 and a columnar part 102, and light is extracted from the transparent substrate 100 side. In this case, light may also be extracted from both surfaces of the light emitting layer. There is also another structure shown in FIG. 11, in which a light emitting layer constituted of a light emitting part 101 and a columnar part 102 is provided on an opaque substrate 100 (which may also be a transparent substrate, on which an electrode or the like is formed if necessary), and light is extracted from one side of the light emitting layer opposite to the substrate 100 side.

Figure 12:
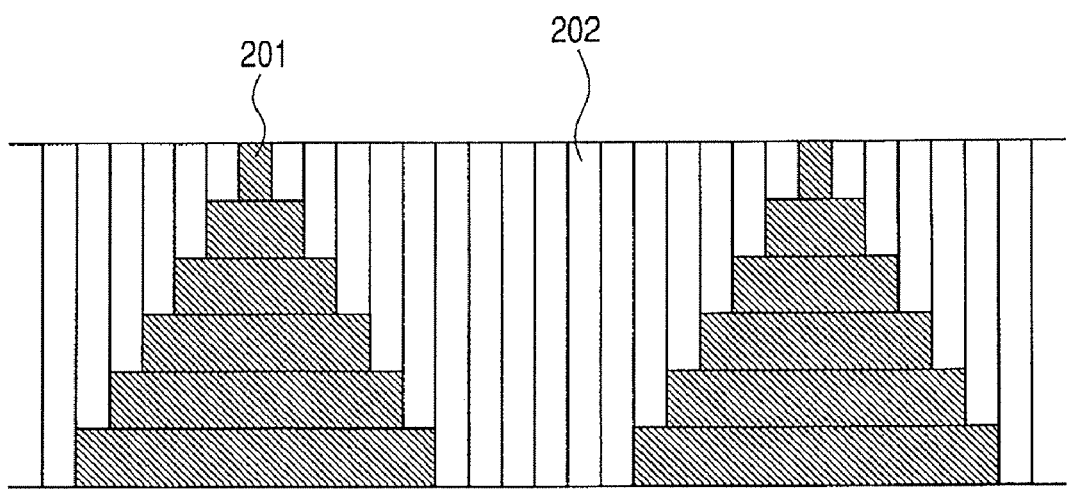
FIG. 12 shows a structural example of a light emitting structure according to still another embodiment of the present invention.
Figure 13:
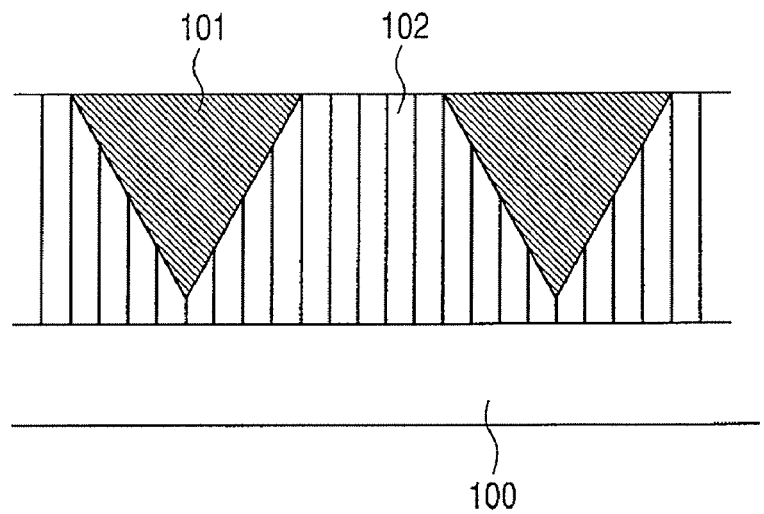
FIG. 13 shows a structural example of the light emitting structure according to still another embodiment of the present invention.
Figure 14:
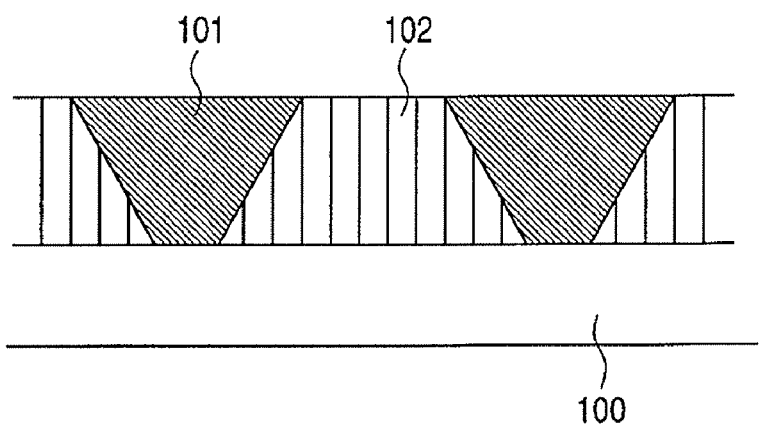
FIG. 14 shows a structural example of the light emitting structure according to still another embodiment of the present invention.

Also, as shown in FIG. 12, circular boards or hexagonal boards may be stacked such that the area of each board decreases toward the top so as to form a light emitting part 201 (in a conical shape or a pyramid shape having a tiered side surface). The shape described above provides the light emitting part 201 with the side surface increased in area, which leads to an increase in light emitting efficiency. Here, six of the tiers are stacked, but the number of the tiers may be determined according to the need. Reference numeral 202 denotes a columnar part. As shown in FIG. 13, the apex of the cone or the pyramid of the light emitting part 101 is not necessarily in contact with the substrate. The light emitting part 101 may also take a trapezoidal shape such as a truncated cone, hexagonal truncated pyramid, or the like as shown in FIG. 14. In FIGS. 13 and 14, reference numerals 100 and 102 denote a substrate and a columnar part, respectively.

Figure 15:
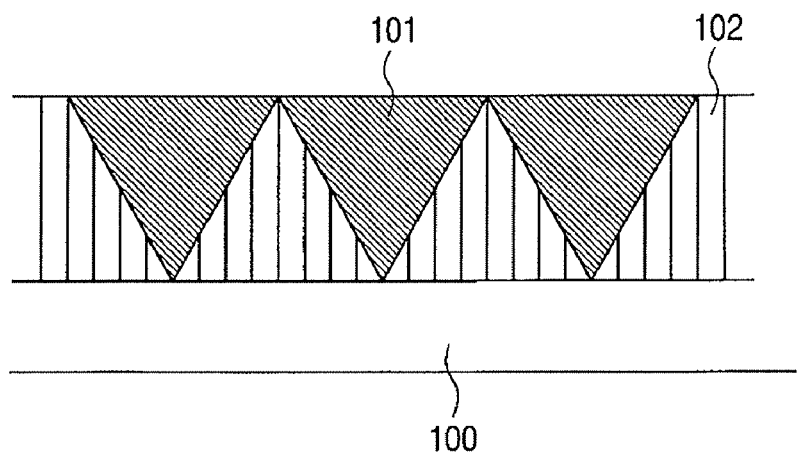
FIG. 15 shows a structural example of the light emitting structure according to still another embodiment of the present invention.

Further, as shown in FIG. 15, the light emitting parts contact with one another at the bottom. Reference numerals 100, 101, and 102 denote a substrate, a light emitting part, and a columnar part, respectively. The light emitting parts 101 each having a regular polygonal pyramid shape such as regular hexagonal pyramid shape, may be arranged such that the bottoms contact with each another leaving no space therebetween. In such the manner, the light emitting parts 101 are arranged with no space therebetween, leading to an increase in light emitting efficiency.

Figure 16:
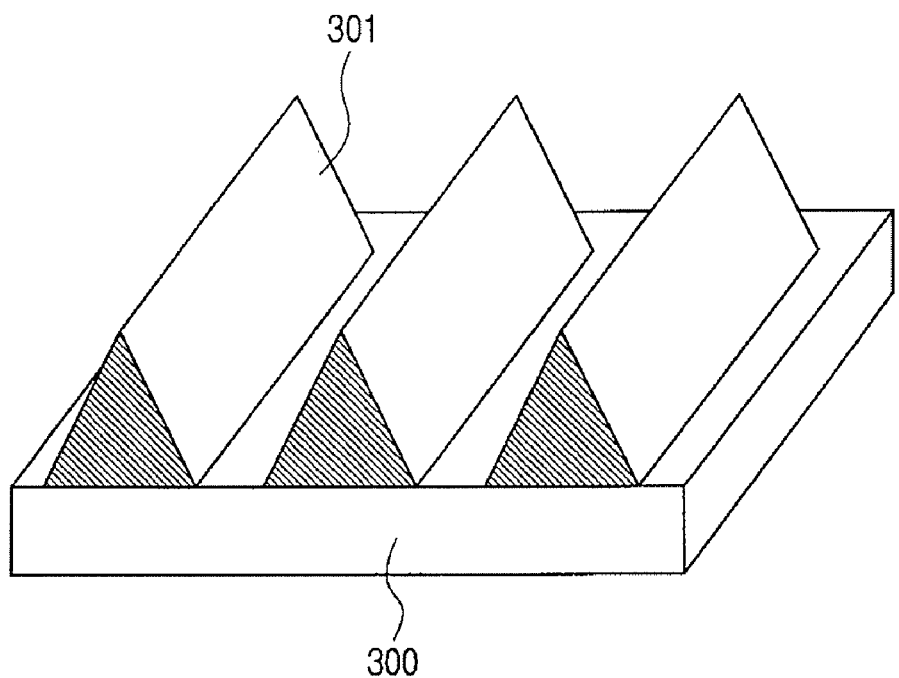
FIG. 16 shows a structural example of the light emitting structure according to still another embodiment of the present invention.

Also, as shown in FIG. 16, the light emitting part 301 may take a triangular pole shape with a triangular section (the light emitting part 301 may also take a trapezoidal pole in cross section), and be arranged on the substrate 300 with a side surface of the triangular pole contacting with the substrate 300. In FIG. 16, the columnar part is not shown.

Hereinafter, the present invention is explained with examples.

EXAMPLE 1

Figure 4A:
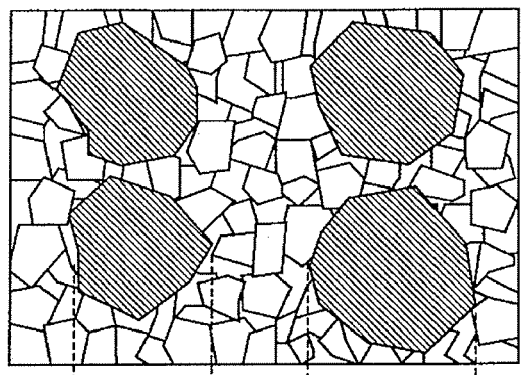
FIGS. 4A and 4B each are structural diagrams of a light emitting material prepared in Example 1.
Figure 4B:
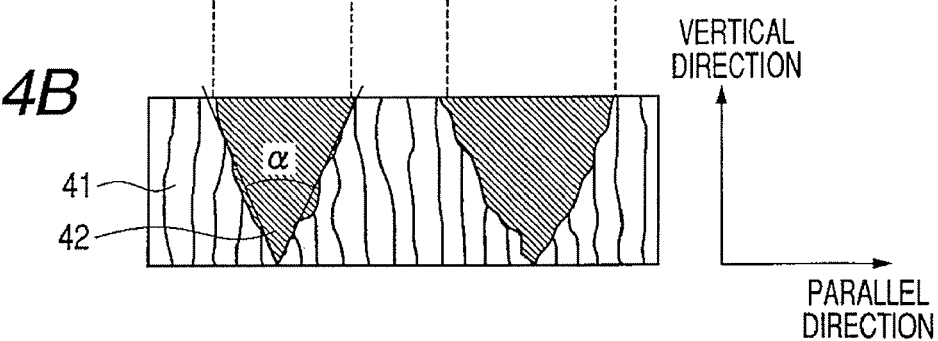

Example 1 is explained with reference to FIGS. 4A and 4B, in which a sputtering method is employed, and materials for a light emitting part and a columnar part each have the chemical formula $ZnWO_4$. In Example 1, a thin film phosphor was formed, which was constituted of a light emitting part with a monoclinic crystalline structure having an inverted cone shape from the substrate toward the film surface and a columnar part with a triclinic crystalline structure having a column shape of about 100 nm in diameter. FIGS. 4A and 4B each are a schematic diagram of the thin film phosphor prepared in Example 1. FIGS. 4A and 4B are schematic diagram each showing a plan structure and a sectional structure, respectively. The thin film phosphor was prepared according to the following procedure.

Figure 5:
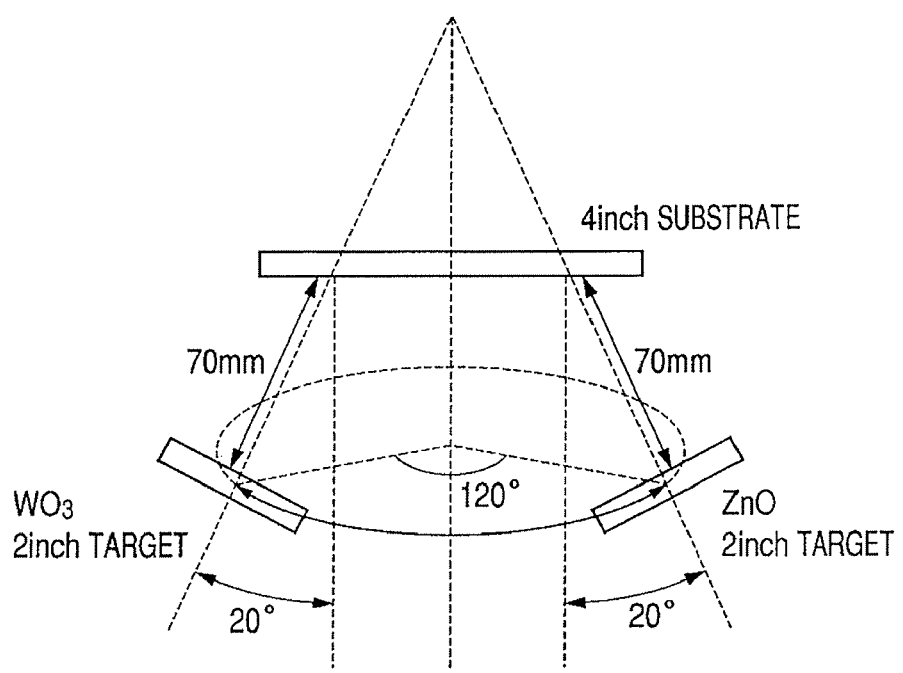
FIG. 5 is a schematic diagram showing a film formation method according to Example 1.

A silicon substrate 1 of 600° C. in substrate temperature was subjected to simultaneous sputtering by using ZnO and $WO_3$ each as a target, to thereby form a phosphor thin film of 700 nm in thickness on the substrate 1 by RF sputtering method. FIG. 5 shows a positional relationship between the substrate 1 and the targets during the film formation. A ZnO target and $WO_3$ target each having a diameter of 2 inch were used as the target, and a silicon substrate of 4 inch in thickness was used as the substrate. The two targets were arranged such that the incident directions thereof were displaced by 120 degrees from each other while being tilted by 20 degrees with respect to the vertical direction of the substrate, and that the incident directions intersect with each other above the center of the substrate. The outputs for the targets were both set to 150 W, and the film formation was performed for 40 minutes. The emission of bluish white light was observed when the film thus prepared was irradiated with ultraviolet light of 254 nm in wavelength.

Transmission electron microscope analyses were performed at the region of the highest fluorescent intensity. It was found, as shown in FIGS. 4A and 4B, that the area was constituted of: a columnar part 41 as a light scattering part having a structure in which columnar crystalline portions of about 100 nm were arranged in a cluster and a light emitting part 42 having a large crystalline structure of an inverted cone shape grown from the silicon substrate, with a diameter of about 1 μm in the bottom of the cone at the film surface. The composition analysis performed on the area by TEM-EDS revealed that the columnar part 41 and the light emitting part 42 both had substantially the same composition. Also, according to the analysis by X-ray diffraction and electron beam diffraction, it was found that the columnar part 41 had a $ZnWO_3$ structure of a triclinic system, and the light emitting part 42 having a large crystalline structure in an inverted cone shape had a $ZnWO_4$ structure of a monoclinic system. Accordingly, it was confirmed that a phosphor thin film constituted of a light emitting part and a columnar part which were the same in composition but different merely in crystalline structure was obtained. When the light emitting part 42 had the cone angle α of 90 degrees, the light emitting part 42 was in contact with about 30 of the columnar parts 41.

Figure 6:
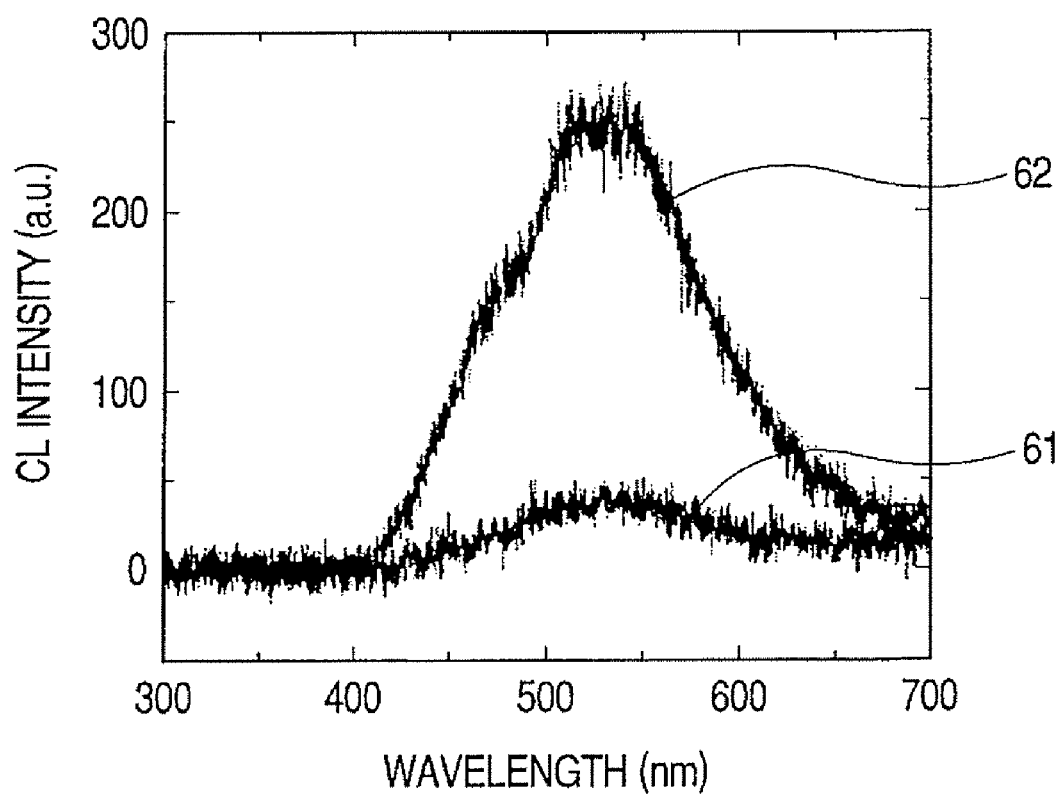
FIG. 6 shows a measurement result of cathode luminescence of Example 1.
Figure 9A:
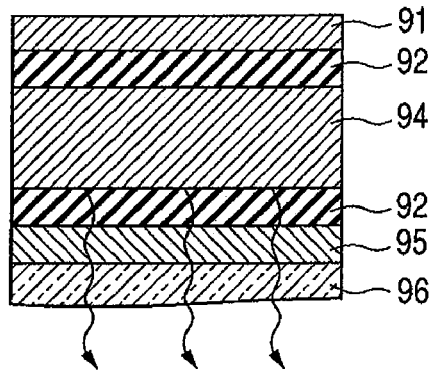
FIGS. 9A and 9B each are a structural diagram showing a conventional example.
Figure 9B:
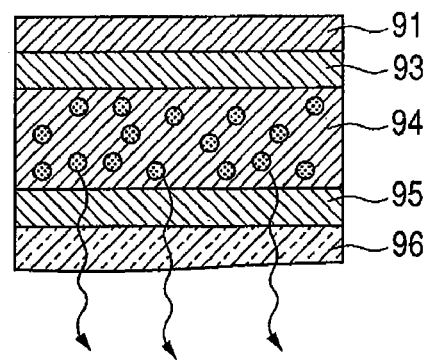

FIG. 6 shows a measurement result of cathode luminescence in TEM through electron irradiation of 80 keV. Light emission 62 from the light emitting part was combined with light extracted from the columnar part serving as a light scattering part, with the result that light emission 62 from the light emitting part exhibited high intensity ranging from 400 to 600 nm. On the other hand, light emission 61 from the columnar part exhibited about one-sixth of the intensity of the light emission 62 from the light emitting part, because light emitted from the columnar part in itself was weak. The light emission of highest intensity was observed in an area where the light emitting part 42 has a cone angle α of about 90 degrees, which may be ascribable to the fact that the number of the columnar parts 41 contacting with the light emitting part 42 increases as the cone angle α increases, allowing light to be extracted more efficiently. On the other hand, however, if the cone angle α increases too much (to exceed 90 degrees), a larger portion of the generated light is subjected to total reflection at the interface between the light emitting part 42 and the columnar part 41. In view of the above, it can be assumed that the optimal light extracting efficiency can be attained with an appropriate angle α. The above-mentioned device structure is excellent in quantum efficiency as compared with the case of using microcrystal, because the losses due to nonluminous joining are reduced at the interface, and the light emitting part 42 allows light to be extracted more efficiently as compared with the case of using monocrystal. Therefore, the light emitting device with high efficiency was obtained.

EXAMPLE 2

Example 2 shows an example of producing a light emitting device using an inorganic light emitting device for a light emitting part. FIGS. 7A to 7L each are a sectional view for each process according to Example 2. Each of the processes is explained in sequence. In the following, each of the processes corresponds to each of FIGS. 7A to 7L. For example, a process (a) corresponds to FIG. 7A.

(a) An ITO film 70 was formed on a transparent substrate 71, and (b) applied with a resin A (with a refractive index of 1.6) 72 to a thickness of 1 μm.

(c) (d) A mold 73 (having a columnar convex structure of 100 nm in diameter, 200 nm in pitch, and 1 μm in height) was pressed against the resin A for patterning, and (e) a resin B (with a refractive index of 1.3) 74 was applied into the patterning, so as to form the columnar part with the resin B.

(f) A photoresist 76 of a negative type was applied, and (g)(h) exposure and development were performed by using a pattern mask 75, and the surface was subjected to etching such that a tapered angle of 90 degrees can be obtained. Here, a shape of the pattern mask may be arbitrarily selected, to thereby obtain the light emitting part in various shapes. For example, the light emitting part may be in a cone shape, a polygonal pyramid shape, and a triangle flute shape, by using the pattern mask 75 in circle, polygon, and a line shape, respectively.

By using the photoresist 76 having a higher etching rate than those of the resins A and B, the photoresist 76 was etched faster than the resins A and B when being etched, with the result that the resins A and B were etched in a tapered shape. The arbitrary tapered angle can be formed by controlling the etching rate ratio between the photoresist and the resins A and B.

(i) A phosphor 77 (for example, ZnS) was embedded in a tapered portion through CVD method, sol-gel method, or sputtering method, and (j) a residual photoresist was removed. (k) A dielectric thick film 78 was formed, and (i) an electrode 79 was formed, to thereby obtain the intended device.

In the light emitting device produced according to the above-mentioned method, light generated in the light emitting part was extracted to the columnar part, where the light was repeatedly subjected to total reflection and made incident on a light extraction surface at a substantially vertical angle. Therefore, total reflection of light was suppressed, to thereby attain external luminous efficiency 1.5 times as much as that of a light emitting device using a uniform light emitting film without having a columnar part serving as a light scattering part.

EXAMPLE 3

Example 3 shows an example of producing a light emitting device using an organic light emitting material for a light emitting part, by using the same process as in Example 2. FIGS. 8A to 8K each are a sectional view for each process according to Example 3. Each of the processes is explained in sequence. In the following, each of the processes corresponds to each of FIGS. 8A to 8K. For example, a process (a) corresponds to FIG. 8A.

(a) An ITO film 80 was formed on a transparent substrate 81, and (b) applied with a resin A (with a refractive index of 1.6) 82 to a thickness of 1 μm.

(c) (d) A mold 83 (having a columnar convex structure of 100 nm in diameter, 200 nm in pitch, and 1 μm in height) was pressed against the resin A for patterning, and (e) a resin B (with a refractive index of 1.3) 84 is applied into the patterning, so as to form the columnar part with the resin B.

(f) A photoresist 86 of a negative type was applied, and (g)(h) exposure and development were performed by using a pattern mask 85, and the device is subjected to etching such that a tapered angle of 90 degrees can be obtained. Here, a shape of the pattern mask 85 may be arbitrarily selected, to thereby obtain the light emitting part in various shapes. For example, the light emitting part may be in a cone shape, a polygonal pyramid shape, and a triangle flute shape, by using the pattern mask 85 in circle, polygon, and a line shape, respectively.

By using the photoresist 86 having a higher etching rate than those of the resins A and B, the photoresist 86 is etched faster than the resins A and B when being etched, with the result that the resins A and B are etched in a tapered shape. The arbitrary tapered angle can be formed by controlling the etching rate ratio between the photoresist and the resins A and B.

(i) A vacuum deposition apparatus was used to deposit TPD of 300 □ to form a hole transporting layer, and then Alq as an organic material light emitting layer 87 was deposited on the TPD film of 500 □ to form a layer serving as both an electronic transporting layer and a light emitting layer, and (j) a residual photoresist was removed. (k) Al was used to form a rear electrode 88, to thereby obtain the intended device.

In the light emitting device produced according to the above-mentioned method, light generated in the light emitting part is extracted to the columnar part, where the light is repeatedly subjected to total reflection and made incident on a light extraction surface at a substantially vertical angle. Therefore, total reflection of light is suppressed, to thereby attain external luminous efficiency 1.2 times as much as that of a light emitting device which uses a uniform light emitting film and does not include a columnar part as a light scattering part.

The present invention can be used for a light emitting layer for a display device such as a flat panel display (FPD) including an electroluminescent (EL) display or a field emission display (ELD).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-353492, filed Dec. 7, 2005, which is hereby incorporated by reference herein in its entirety.

What is claimed is:

1. A light emitting structure comprising a light emitting layer provided on a primary surface, the light emitting layer comprising a plurality of light emitting parts and a plurality of columnar parts provided between the plurality of light emitting parts, wherein:

the light emitting parts each have a solid shape of which cross-sectional area in a direction parallel to the primary surface decreases from the primary surface side to a side opposite to the primary surface side, or from the side opposite to the primary surface side to the primary surface side; and at least a part of the plurality of columnar parts is in contact with the light emitting parts, and light generated in the light emitting parts is extracted through the columnar parts.

2. The light emitting structure according to claim 1, wherein the plurality of columnar parts extend in a substantially vertical direction with respect to the primary surface.

3. The light emitting structure according to claim 1, wherein each light emitting part is a cone or a pyramid.

4. The light emitting structure according to claim 1, wherein each light emitting part is in contact with at least 20 of the columnar parts.

5. The light emitting structure according to claim 1, wherein, the light emitting layer is 5 μm or less in thickness.

6. The light emitting structure according to claim 1, wherein:

a cross-sectional shape of each light emitting part in a direction parallel to the primary surface is a circle, a regular triangle, or a regular polygon of regular tetragon or more; a diameter of the circle, a side of the regular triangle, or a diagonal line of the polygon of regular tetragon or more is 1 μm or less; a cross-sectional shape of each columnar part in a direction parallel to the primary surface is a circle, a regular triangle, or a regular polygon of regular tetragon or more; and a diameter of the circle, a side of the regular triangle, or a diagonal line of the polygon of regular tetragon or more is 300 nm or less.

7. The light emitting structure according to claim 1, wherein: when a cross-sectional shape of a light emitting part in a direction parallel to the primary surface is converted into a circle having the same cross-sectional area of the light emitting part, a diameter of the circle is 1 μm or less; and when a cross-sectional shape of a columnar part in a direction parallel to the primary surface is converted into a circle having the same cross-sectional area of the columnar part, a diameter of the circle is 300 nm or less.

8. The light emitting structure according to claim 3, wherein a cone angle or a pyramid angle of the cone or the pyramid is in a range of 30 to 90 degrees.

9. The light emitting structure according to claim 1, wherein:

each columnar part has a refractive index $n_1$;
each light emitting part has a refractive index $n_2$; and
a refractive index ratio $n_2/n_1$ is $n_2/n_1 > 1$.

10. The light emitting structure according to claim 1, wherein each light emitting part and each columnar part are formed of a material having a chemical formula $ZnWO_4$.

11. The light emitting structure according to claim 10, wherein each light emitting part has a monoclinic crystalline structure.

12. The light emitting structure according to claim 10, wherein each columnar part has a triclinic crystalline structure.

* * * * *